US007871723B2

United States Patent
Ikeda et al.

(10) Patent No.: US 7,871,723 B2
(45) Date of Patent: Jan. 18, 2011

(54) POWER SOURCE DEVICE

(75) Inventors: Tomohiro Ikeda, Makinohara (JP);
Takao Shoji, Makinohara (JP); Shinichi Yanagihara, Makinohara (JP); Yoshiaki Ichikawa, Makinohara (JP); Kazuhisa Meguro, Toyota (JP); Yasuyoshi Fukao, Toyota (JP)

(73) Assignees: Yazaki Corporation (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 12/196,337

(22) Filed: Aug. 22, 2008

(65) Prior Publication Data

US 2009/0053591 A1 Feb. 26, 2009

(30) Foreign Application Priority Data

Aug. 23, 2007 (JP) .............................. 2007-216715

(51) Int. Cl.
*H01M 2/10* (2006.01)
*H01M 6/42* (2006.01)
*H01M 2/20* (2006.01)

(52) U.S. Cl. ........................................ 429/159; 429/99
(58) Field of Classification Search .................. 429/159, 429/54, 82, 53; 220/326
See application file for complete search history.

(56) References Cited

U.S. PATENT DOCUMENTS 4,556,612 A * 12/1985 Thibault et al. ................ 429/54
6,394,300 B1 * 5/2002 Bosy ........................... 220/326

FOREIGN PATENT DOCUMENTS

| JP | 5-251071 A | | 9/1993 |
| JP | 7-22459 U | | 4/1995 |
| JP | 07-22459 U | * | 4/1995 |
| JP | 2004-95381 A | | 3/2004 |
| JP | 2005209366 A | * | 8/2005 |

OTHER PUBLICATIONS

Machine translation of JP 05-251071 A, Mori et al., Sep. 1993.*
Machine translation of JP 07-022459 U, Iizuka, Ichiro, Apr. 1995.*
Machine translation of JP 2005209366 A, Takatsu et al., Aug. 2005.*

* cited by examiner

*Primary Examiner*—Jonathan Crepeau
*Assistant Examiner*—Kenneth Douyette
(74) *Attorney, Agent, or Firm*—Sughrue Mion, PLLC (57) ABSTRACT

A power source device includes a battery assembly which includes a plurality of batteries each having a positive electrode at one end and a negative electrode at the other end, a plurality of connecting members, each of which connects the positive electrode of one battery and the negative electrode of the other battery of the battery assembly, the one and the other batteries adjoining each other, and a plate to which the connecting members are attached, and the plate adapted to the battery assembly. The battery assembly and the plate include a positioning section that relatively positions the battery assembly and the plate. The battery assembly and the plate include a plate displacement section that displaces the plate so that the connecting members relatively abut against the corresponding positive electrodes and negative electrodes of the battery assembly when the plate is mounted on the battery assembly.

13 Claims, 5 Drawing Sheets

POWER SOURCE DEVICE

BACKGROUND

The present invention relates to a power source device including a plurality of batteries connected in series, the power source device mounted for example on a hybrid vehicle capable of traveling by a driving force from an internal-combustion engine or a motor, or an electric vehicle.

A hybrid vehicle traveling by a driving force from an internal-combustion engine or a motor, or an electric vehicle traveling by a driving force from a motor includes a power source device for storing and releasing electric energy. The power source device includes a battery assembly composed of a plurality of batteries. The batteries are connected in series to obtain a desired voltage. For example, a nickel metal hydride (NiMH) battery is used as such a battery.

The power source device connects, by using a connecting member, the positive electrode of one battery of a pair of batteries adjacent to each other out of a plurality of batteries and the negative electrode of the other battery of the pair of batteries to connect a plurality of batteries of a battery assembly in series. This configuration makes it necessary to assemble a plurality of connecting members to a battery assembly thus making cumbersome the assembly work of a power source device. This is more eminent by an increase in the number of batteries constituting a power source device. This configuration may be a hindrance to a compact, lightweight and simple design of a power source device.

In order to solve such problems, various types of power source devices have been used (for example, refer to Patent Reference 1). This type of power source device includes a battery assembly composed of a plurality of batteries, a plurality of bus bars as connecting members for connecting the batteries in series, and a plate on which the plurality of bus bars are attached and which is mounted on the battery assembly. On one surface of the battery body of a battery are arranged a positive electrode and a negative electrode. On the perimeter surface of the positive and negative electrodes is formed a screw groove. The plate has a planar shape formed into an almost flat rectangular plate. The bus bar and the plate respectively include a plurality of holes used to route a positive electrode and a negative electrode.

To assemble such a power source device, a plurality of batteries are arranged side by side so that the positive electrode of a battery will be adjacent to the negative electrode of a separate battery. Next, a plate including a plurality of bus bars in a predetermined position is laid on the batteries. The positive and negative electrodes of the batteries are routed through the plate holes and bus bar holes to connect the plate and the bus bars to the battery assembly. Finally, nuts are screwed into the electrodes where screw grooves are formed to fix the connection of the battery assembly and the plate as well as bus bars. This connects the batteries in series by way of a plurality of bus bars.

With the power source device of the above configuration, a plurality of bus bars are attached to a plate before the plate is mounted on the battery assembly. Thus, connection of the battery assembly and the plate as well as the plurality of bus bars is complete when the positive and negative electrodes of the batteries are simultaneously routed through the plurality of holes in the plate and the holes for the plurality of bus bars attached to the plate and are screwed. This has simplified the assembly work in connecting a plurality of batteries of a battery assembly in series.

[Patent Reference 1] JP-A-2004-95381

With the power source device described in Patent Reference 1, the positive and negative electrodes of the batteries are simultaneously routed through the plurality of holes in the plate and the holes for the plurality of bus bars attached to the plate before the plate is mounted on the battery assembly. The electrodes slide on the inner surfaces of the plate holes and bus bar holes to cause friction, which makes it difficult to assemble a plate to a battery assembly thus placing a load on the worker. When the number of batteries, that is, the number of electrodes in a battery assembly is increased for multi-pole configuration to raise the voltage of the power source device, the load on the worker increases.

SUMMARY

An object of the invention is to provide a power source device capable of simplifying the assembly work.

In order to solve the problems and attain the object, the first aspect of the invention provides a power source device comprising:

a battery assembly which includes a plurality of batteries each having a positive electrode at one end and a negative electrode at the other end;

a plurality of connecting members, each of which connects the positive electrode of one battery and the negative electrode of the other battery of the battery assembly, the one and the other batteries adjoining each other; and a plate to which the connecting members are attached, and the plate attached to the battery assembly, wherein the battery assembly and the plate include a positioning section that relatively positions the battery assembly and the plate; and wherein the battery assembly and the plate include a plate displacement section that displaces the plate so that the connecting members relatively abut against the corresponding positive electrodes and negative electrodes of the battery assembly when the plate is attached to the battery assembly.

The second aspect of the invention provides the power source device according to the first aspect, wherein the positioning section includes a plurality of positioning projections protruding from one surface of the battery assembly and a plurality of positioning holes arranged in the plate into which the positioning projections are respectively inserted; and wherein a diameter of each of the positioning holes is greater than that of each of the positioning projections.

The third aspect of the invention provides the power source device according to the first or second aspect, wherein the plate displacement section includes a plurality of guide projections protruding from one surface of the battery assembly and a plurality of guide holes arranged in the plate into which the guide projections are respectively inserted; and wherein the connecting members are inclined in a direction in which the connecting members respectively leave the corresponding positive electrodes and negative electrodes as the guide projections leave the battery assembly.

The fourth aspect of the invention provides the power source device according to any one the first to third aspects, wherein the plate includes:

a main body arranged at the center of the battery assembly;

a pair of outer side parts arranged parallel to the main body and sandwiching the main body therebetween; and elastically deformable coupling parts respectively coupling the main body to the pair of outer side parts.

The first aspect of the invention includes the positioning section for relatively positioning the battery assembly and the plate and the plate displacement section for displacing the plate so that a plurality of connecting members respectively abut against the corresponding positive electrodes and negative electrodes when the plate is mounted on the battery assembly. It is thus possible to readily arrange a connecting member in a desired position of a battery assembly, thereby reducing the working man-hours of assembling a connecting member to a battery assembly.

With the second aspect of the invention, the positioning section includes the positioning projections protruding from one surface of the battery assembly and the positioning holes arranged in the plate, each of the positioning holes having a diameter formed larger than that of the positioning boss. It is thus possible to position the battery assembly and the plate by inserting the positioning projections into the positioning holes. It is thus possible to readily arrange the plate on the battery assembly, thereby reducing the working man-hours of assembling the connecting member to the battery assembly.

With the third aspect of the invention, the plate displacement section includes the guide projections protruding from one surface of the battery assembly and the guide holes arranged in the plate into which the guide projections are respectively inserted. The plurality of connecting members are inclined in the direction in which the connecting members respectively leave the corresponding positive electrodes and negative electrodes as the guide projections leave the connecting members. It is thus possible to displace the plate with respect to the battery assembly in a direction in which the connecting members respectively approach the corresponding positive electrodes and negative electrodes by inserting the guide projections into the guide holes. This allows the connecting members to respectively abut against the corresponding positive electrodes and negative electrodes.

With the fourth aspect of the invention, the plate includes the main body and the pair of outer side parts. The outer side parts as a pair are respectively coupled to the main body via the elastically deformable coupling parts, thus respectively displacing the main body and the pair of outer side parts relative to the battery assembly. This allows the connecting members to respectively abut against the corresponding positive electrodes and negative electrodes.

As described above, with the first aspect of the invention, it is thus possible to readily arrange the connecting member in a desired position of the battery assembly, thereby reducing the working man-hours of assembling the connecting member to the battery assembly. This simplifies the assembly work of a power source device.

With the second aspect of the invention, it is thus possible to position the battery assembly and the plate by inserting the positioning projections into the positioning holes. It is thus possible to readily arrange the plate on the battery assembly, thereby reducing the working man-hours of assembling the connecting member to the battery assembly. This simplifies the assembly work of a power source device.

With the third aspect of the invention, it is thus possible to displace the plate with respect to the battery assembly in a direction in which the connecting members respectively approach the corresponding positive electrodes and negative electrodes by inserting the guide projections into the guide holes. This allows the connecting members to respectively abut against the corresponding positive electrodes and negative electrodes. It is thus possible to readily arrange the connecting member in a desired position of the battery assembly, thereby reducing the working man-hours of assembling a connecting member to a battery assembly.

With the fourth aspect of the invention, it is possible to respectively displace the main body and the pair of outer side parts relative to the battery assembly. This allows the plurality of connecting members to respectively abut against the corresponding positive electrodes and negative electrodes. It is thus possible to reliably arrange the connecting member in a desired position of a battery assembly.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

A power source device according to an embodiment of the invention will be described referring to FIGS. 1 through 7. A power source device 1 according to an embodiment of the invention is mounted on a hybrid vehicle traveling by a driving force from an internal-combustion engine or a motor, or an electric vehicle traveling by a driving force from a motor.

Figure 1:
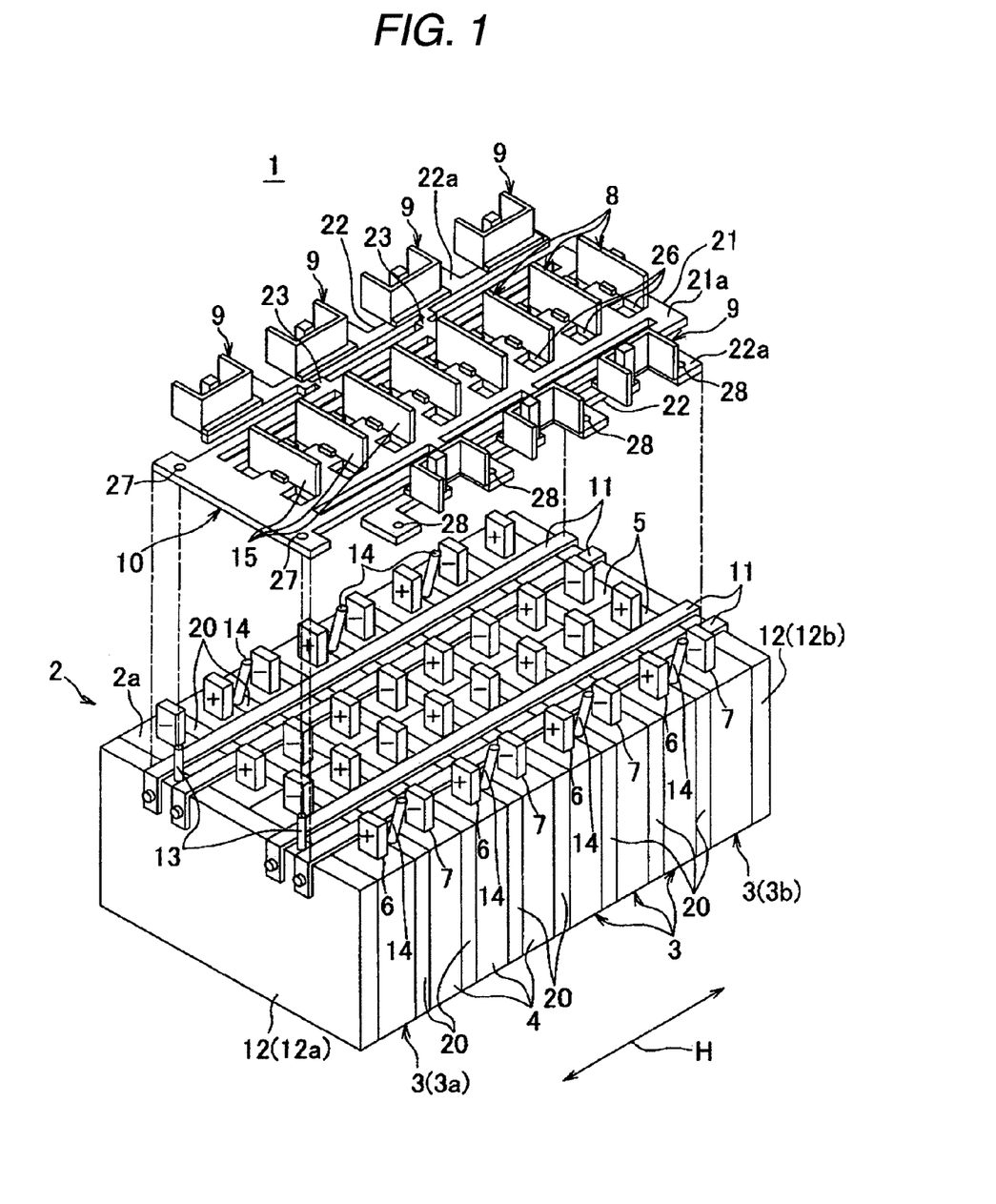
FIG. 1 is an exploded perspective view of a power source device according to embodiment of the invention.

As shown in FIG. 1, the power source device 1 according to the invention includes a battery assembly 2, bus bars 8, 9 as connecting members for connecting batteries 3 described later in series, and a plate 10 on which the bus bars 8, 9 are attached and which is mounted on the battery assembly 2.

The battery assembly 2 includes a plurality of batteries 3 as shown in FIG. 1. The battery 3 includes a battery body 4 in a square shape, a positive electrode (hereinafter referred to as the positive pole) 6, and a negative electrode (hereinafter referred to as the negative pole) 7. The positive pole 6 is arranged on one end of the battery body 4. The negative pole 7 is arranged on the other end of the battery body 4. The positive pole 6 and the negative pole 7 are formed into a prism shape and protrude in the same direction from one end surface 5 (hereinafter referred to as one end surface) of the battery body 4 in parallel to each other.

As shown in FIG. 1, the plurality of batteries 3 are arranged in one direction (arrow H in FIG. 1) with one end surface 5 of each of the battery bodies 4 is positioned in a same plane so that the positive pole 6 and the negative pole 7 of batteries 3 adjacent to each other will adjoin each other. The plurality of batteries 3 are arranged in two rows so that the batteries 3 will be opposed to each other in a direction crossing one direction H and the one direction H the batteries 3 in one row adjoin each other will be parallel to the one direction H the batteries 3 in the other row adjoin each other. The positive pole 6 and the negative pole 7 of a battery 3 and another adjacent to each other adjoin each other. In other words, the batteries 3 are arranged with the positive pole 6 and the negative pole 7 placed in alternately opposed directions.

As shown in FIG. 1, the battery assembly 2 includes a binding band 11 for binding and fixing together a plurality of batteries 3, an end plate 12, an inter-battery plate 20, a positioning boss 13, and a guide boss 14.

A plurality of binding bands 11 made of an insulating material are formed into a band plate. The plurality of binding bands 11 are respectively arranged on the top surface 2a of the battery assembly 2 and the bottom surface 2b opposed to the top surface 2a. The plurality of binding bands 11 are respectively arranged parallel to the one direction H in which the batteries 3 are arranged and spaced relation to each other.

Figure 2:
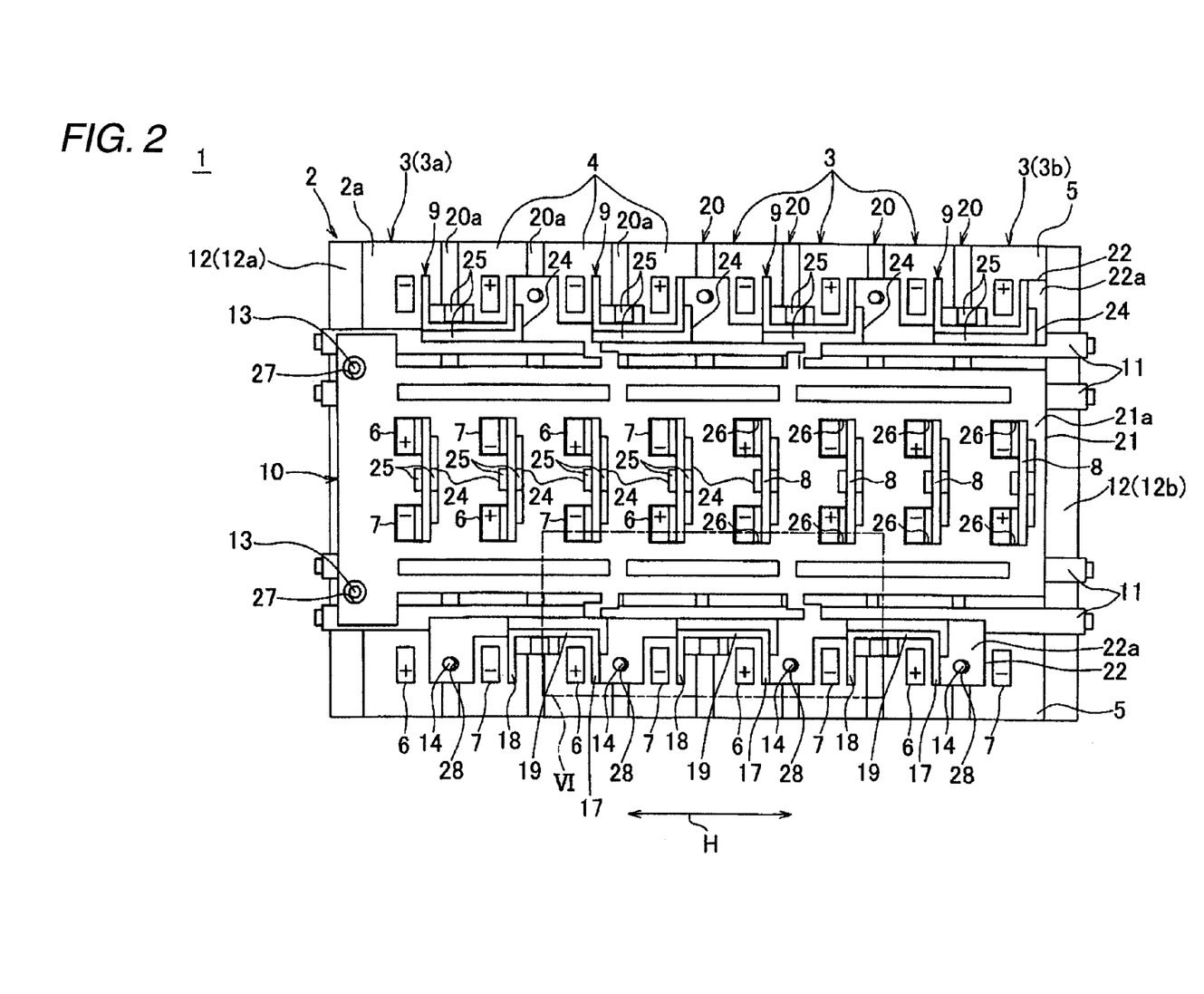
FIG. 2 is a plan view showing the state where a plate is positioned on a battery assembly in the process of assembling the power source device shown in FIG. 1.

The end plate 12 is made of an insulating material and formed into a square shape. The end plates 12 as a pair are arranged each at both ends of the battery assembly 2 in the one direction H. As shown in FIG. 1 or 2, the end plates 12a, 12b sandwich the plurality of batteries 3 and inter-battery plates 20 therebetween and are each fixed to both ends of the binding band 11 in its longitudinal direction by way of bolts, thus binding or integrating to hold the plurality of batteries 3 and inter-battery plates 20.

Figure 4:
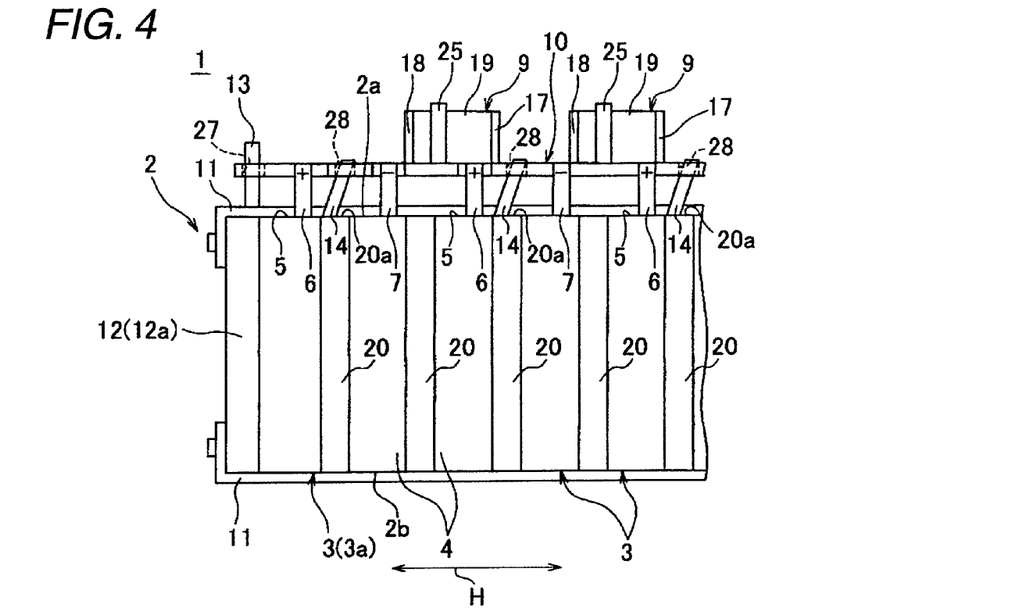
FIG. 4 is an enlarged side view of the key section of the power source device shown in FIG. 2.

As shown in FIG. 1 or 4, the positioning boss 13 is formed into the shape of a circular cylinder and longer than the guide boss 14. The positioning boss 13 protrudes in vertical direction from one end plate 12a arranged on the side of one battery 3a positioned at one end of the battery assembly 2 among the plurality of batteries 3 arranged in the one direction H of the battery assembly 2. The positioning projections 13 as a pair are arranged while spaced relation to each other in a direction crossing the one direction H of the battery assembly 2. The positioning projections 13 as a pair are parallel to each other and arranged to pass through positioning holes 27 described later. The positioning projections 13 and positioning holes 27 described later together form a positioning section, which relatively positions the battery assembly 2 and the plate 10.

The inter-battery plate 20 is made of an insulating material and formed into a square shape. A plurality of inter-battery plate 20 are arranged between a plurality of batteries 3 arranged in the one direction H of the battery assembly 2, as shown in FIG. 1 or 2.

As shown in FIG. 1 or 4, the guide boss 14 is formed in the shape of a circular cylinder and a plurality of guide projections 14 are arranged. Each of the plurality of guide projections 14 protrudes from one surface 20a positioned in the same plane as the one end surface 5 of the plurality of batteries 3 of the inter-battery plate 20. Each of the plurality of guide projections 14 is arranged at one of the ends of each inter-battery plate 20 opposed in a direction crossing the one direction H in alternately opposed directions.

The plurality of guide projections 14 are formed to be inclined so as to gradually approach the other end of the battery assembly 2 in the one direction H as guide projections 14 leave the inter-battery plate 20, that is, the battery assembly 2. The guide projections 14 are formed to be inclined in a direction in which a plurality of bus bars 8, 9 respectively leave the corresponding positive poles 6 and negative poles 7 when the guide projections 14 are inserted into guide holes 28 described later as the guide projections 14 leave the battery assembly 2.

Figure 3:
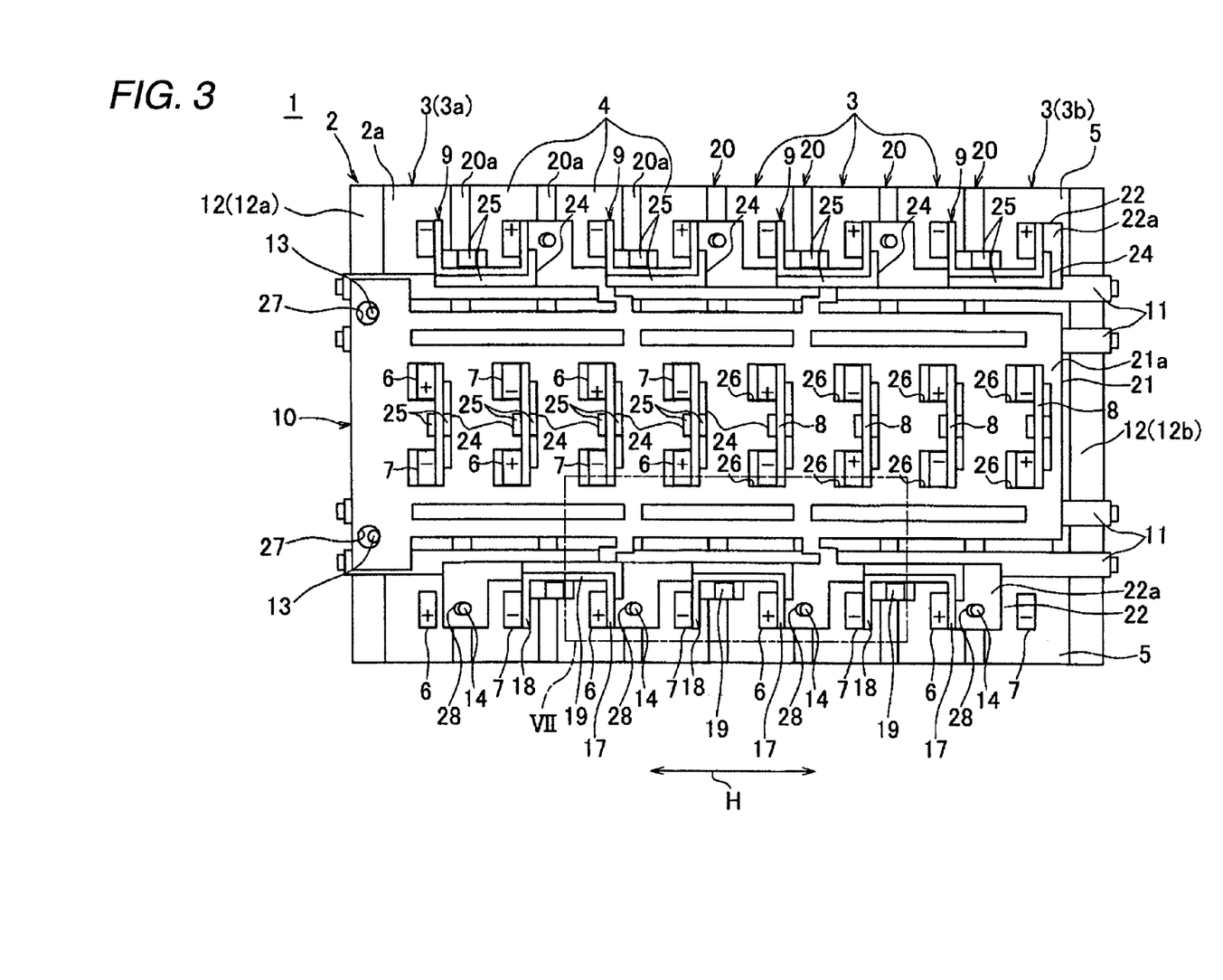
FIG. 3 is a plan view showing the state where a plate is mounted on a battery assembly in the process of assembling the power source device shown in FIG. 1.

As shown in FIG. 2 or 3, the plurality of guide projections 14 are arranged each at both ends opposed in a direction crossing the one direction H of the battery assembly 2 so as to pass through guide holes 28 described later arranged equidistantly in the one direction H. The guide projections 14 and the guide holes 28 described later together form a plate displacement section, which displaces the plate 10 with respect to the battery assembly 2 in a direction in which the plurality of bus bars 8, 9 respectively approach the corresponding positive poles 6 and negative poles 7.

A plurality of bus bars 8,9 each formed by a conductive metal are provided. As shown in FIGS. 1 to 3, the bus bars 8 are formed into band plates and arranged on the surface 21a of the main body 21 (described later) of the plate 10 in a direction parallel to a direction crossing the one direction H in which the plurality of batteries 3 are arranged, and mounted inside a bus bar accommodating part 24 described later. The plurality of bus bars 8 have their positive poles 6 and negative poles 7 respectively connected to one surface 15 opposed in the one direction H to connect the positive pole 6 of a battery 3 and the adjacent negative pole 7 of an adjoining battery 3.

As shown in FIGS. 1 to 3, the bus bar 9 includes a positive pole connecting wall 17 connected to the positive pole 6, a negative pole connecting wall 18 connected to the negative pole 7, and a coupling wall 19 of an almost rectangular shape for connecting one end of the positive pole connecting wall 17 and one end of the negative pole connecting wall 18. The bus bar 9 is formed into an almost U shape as a whole. The positive pole connecting wall 17 and the negative pole connecting wall 18 are respectively formed in an almost rectangular shape and are opposed to each other with a spacing therebetween and are parallel to each other.

The bus bars 9 are arranged on the respective surfaces 22a of the outer side parts 22 as a pair (described later) of the plate 10 and mounted inside the bus bar accommodating part 24 described later. The bus bars 9 have their positive poles 6 connected to a surface of the positive pole connecting wall 17 opposed to the negative pole connecting wall 18 and negative poles 7 connected to a surface of the negative pole connecting wall 18 apart from the positive pole connecting wall 17 to connect the positive pole 6 of a battery 3 and the adjacent negative pole 7 of an adjoining battery 3.

The plate 10 is made of an insulating synthetic resin and formed into a flat plate. As shown in FIG. 1, the plate 10 is laid on the top surface 2a of the battery assembly 2. The plate 10 is formed smaller than the top surface 2a. The plate 10 includes a main body 21 arranged at the center of the battery assembly 2, a pair of outer side parts 22 sandwiching the main body 21 therebetween, and a coupling part 23 for coupling the main body 21 to the pair of outer side parts 22.

The main body 21 has a planar shape formed into an almost flat rectangular plate and includes electrode routing holes 26 for routing the positive poles 6 and negative poles 7 of the batteries 3. The main body 21 is laid on the top surface 2a of the battery assembly 2 in an almost center position of the battery assembly 2 with the positive poles 6 and negative poles 7 routed through the electrode routing holes 26. The main body 21 includes a plurality of bus bar accommodating parts 24 on the surface 21a exposed when the main body 21 is laid on the top surface 2a. The plurality of bus bar accommodating parts 24 are formed by a plurality of bulkheads 25 erected from the surface 21a. The main body 21 has bus bars 8 arranged in the bus bar accommodating parts 24 to be mounted.

The main body 21 includes positioning holes 27 allowing the positioning projections 13 to pass through. The positioning holes 27 as a pair are arranged to position at one end of the battery assembly 2 in one direction H when the main body 21 is mounted on the battery assembly 2, spaced in a direction crossing the one direction H. The positioning holes 27 and the positioning projections 13 together form the positioning section, which relatively positions the battery assembly 2 and the plate 10.

The outer side parts 22 as a pair are arranged parallel to the main body 21 and arrange therebetween the main body 21. The outer side parts 22 as a pair respectively include a plurality of bus bar accommodating parts 24 on the surface 22a exposed when the outer side parts are laid on the top surface 2a of the battery assembly 2. The plurality of bus bar accommodating parts 24 are formed by a plurality of bulkheads 25 erected from the surface 22a. The outer side parts 22 as a pair respectively include bus bars 9 arranged in the bus bar accommodating parts 24 to be mounted.

The outer side parts 22 as a pair respectively include guide holes 28 allowing the guide projections 14 to pass through. A plurality of guide holes 28 are arranged with intervals in the one direction H, to position at both ends of the battery assembly 2 opposed in a direction crossing the one direction H when the pair of outer side parts 22 is mounted on the battery assembly 2. The guide holes 28 and the guide projections 14 together form the plate displacement section, which displaces the plate 10 with respect to the battery assembly 2 in a direction in which the plurality of bus bars 8, 9 respectively approach the corresponding positive poles 6 and negative poles 7.

A plurality of coupling parts 23 are arranged between the main body 21 and each outer side part 22, spaced in one direction H. Each of the coupling parts as a pair has one end connected to the end of the main body 21 in one direction H and the other end connected to the ends of the mutually opposing sides of the outer side parts 22 as a pair. The plurality of coupling parts 23 respectively couple the main body 21 and the pair of outer side parts 22.

Each of the plurality of coupling parts 23 is formed into a thin crank shape and elastically deformable. Each of the plurality of coupling parts 23 is elastically deformed to allow the main body 21 and the pair of outer side parts 22 to be individually displaced with respect to the battery assembly 2.

To assemble the power source device 1 of the above configuration, batteries 3 arranged in two rows in one direction H are sandwiched between the end plates 12 as a pair as shown in FIG. 1. Then, a plurality of binding bands 11 are passed over the top surface 2a and bottom surface 2b of the battery assembly 2 while spaced from each other. Both ends of each of the plurality of binding bands 11 in longitudinal direction are fixed with bolts to the pair of end plates 12 to bind the plurality of batteries 3 and integrate the battery assembly 2.

Next, as shown in FIG. 1, bus bars 8 are arranged in the bus bar accommodating part 24 of the main body 21 to attach the bus bars 8 to the main body 21. Bus bars 9 are arranged in the bus bar accommodating part 24 of each outer side part 22 to attach the bus bars 9 to each outer side part 22. Then the bus bars 8, 9 are attached to the plate 10.

Next, as shown in FIG. 2, the plate 10 is positioned on the battery assembly 2. The positioning projections 13 of one end plate 12a are inserted into the positioning holes 27 of the main body 21 of the plate 10 to relatively position the battery assembly 2 and the plate 10.

Figure 6:
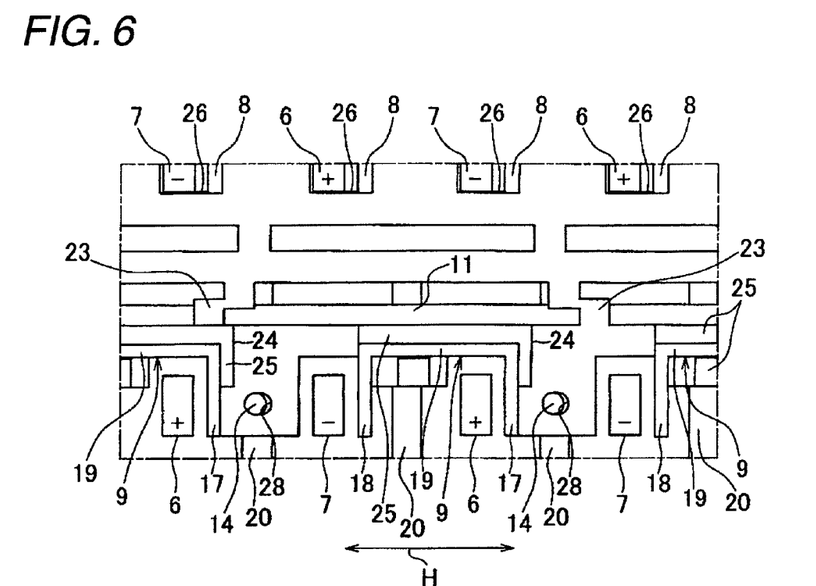
FIG. 6 is an enlarged plan view of a VI part in FIG. 2.

As shown in FIG. 4 or 6, the positioning projections 13 are further inserted into the positioning holes 27 to bring the plate 10 closer to the battery assembly 2. The positive poles 6 and negative poles 7 of the batteries 3 of the battery assembly 2 are respectively inserted into the electrode routing holes 26 of the plate 10. The guide projections 14 arranged on the inter-battery plate 20 of the battery assembly 2 enter the guide holes 28 of the plate 10. In this process, the bus bars 8 of the main body 21 of the plate 10, the positive pole connecting wall 17 and the negative pole connecting wall 18, and the positive pole 6 and negative pole 7 of each battery 3 are arranged respectively parallel to each other.

Figure 5:
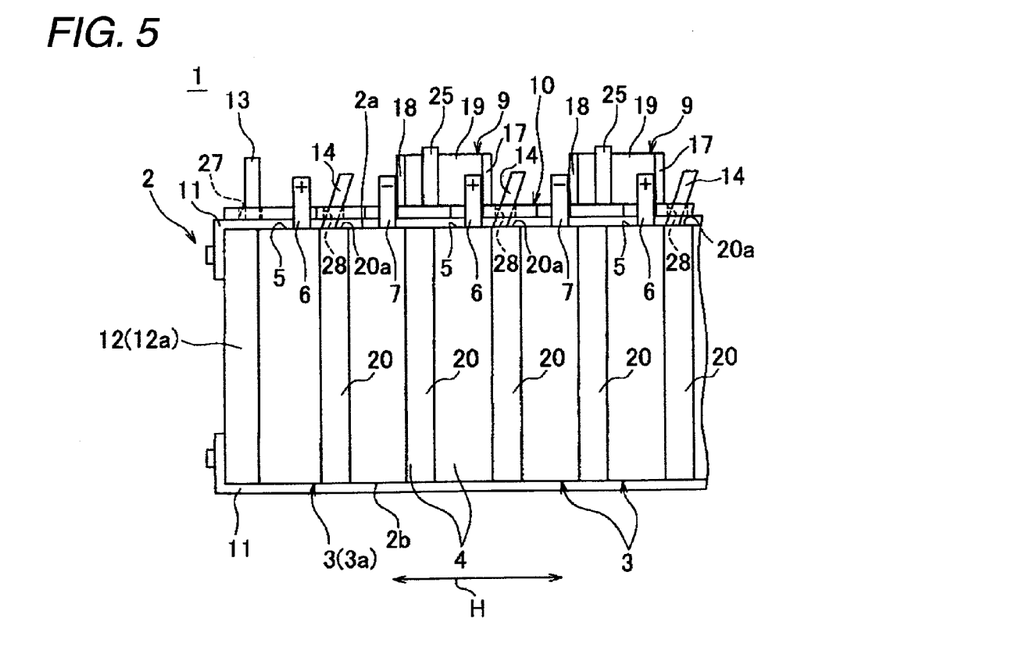
FIG. 5 is an enlarged side view of the key section of the power source device shown in FIG. 3.
Figure 7:
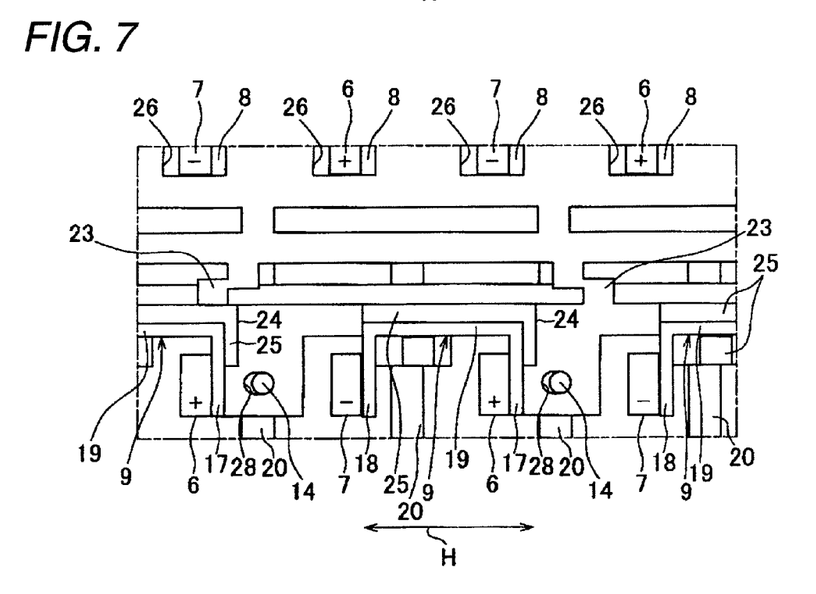
FIG. 7 is an enlarged plan view of a VII part in FIG. 3.

As shown in FIGS. 3, 5 and 7, when the guide projections 14 are inserted into the guide holes 28, the plate 10 is displaced with respect to the battery assembly 2 in a direction in which the plurality of bus bars 8, 9 approach the corresponding positive poles 6 and negative poles 7. The bus bars 8, 9 abut against the corresponding positive poles 6 and negative poles 7.

Then, these bus bars 8, 9 are mounted on the corresponding positive poles 6 and negative poles 7. As shown in FIG. 2, the bus bars 8, 9 are mounted to connect a positive pole 6 and a negative pole 7 adjacent to each other excluding the negative pole 7 of a battery 3a positioned at one end out of the plurality of arranged batteries 3 and the positive pole 6 of a battery 3b positioned at the other end, thus connecting the batteries 3 of the battery assembly 2 in series.

Each bus bar 8 in the shape of a flat plate is connected while the positive pole 6 and the negative pole 7 are fixed by welding to one surface of the bus bar 8 parallel to one direction H. Each channel-shaped bus bar 9 is connected while the positive pole 6 abuts against the surface of the positive pole connecting wall 17 opposed to the negative pole connecting wall 18 and the negative pole 7 abuts against the surface of the negative pole connecting wall 18 apart from the positive pole connecting wall 17, and the positive pole connecting wall 17 and the positive pole 6 in contact as well as the negative pole connecting wall 18 and the negative pole 7 in contact are respectively fixed and connected via welding.

The positive pole 6 of a battery 3 and the adjacent positive pole 6 of the negative pole 7 of an adjoining battery 3 are connected to the positive pole connecting wall 17 and the negative pole connecting wall 18. The spacing between the surface of the positive pole connecting wall 17 of the bus bar 9 opposed to the negative pole connecting wall 18 and the surface of the negative pole connecting wall 18 apart from the positive pole connecting wall 17 is almost equal to the spacing between the surface on the side of the positive pole connecting part of the positive pole 6 and the surface on the side of the negative pole connecting part of the negative pole 7. In this way, the plurality of batteries 3 constituting the battery assembly 2 are connected in series by way of bus bars 8, 9.

Finally, the bus bars 8, 9 are connected via wires to a measuring part (not shown) for measuring a potential difference between the positive pole 6 and negative pole 7 of the batteries 3 to connect the battery assembly 2 and the measuring part. This completes assembly of the power source device 1.

This embodiment includes positioning means for relatively positioning the battery assembly 2 and the plate 10 and plate displacement means for displacing the plate 10 so as to allow a plurality of bus bars 8, 9 to respectively abut against the corresponding positive poles 6 and negative poles 7 when the plate 10 is mounted on the battery assembly 2.

It is thus possible to readily arrange bus bars 8, 9 in a desired position of the battery assembly 2, thereby reducing the number of components for assembling the bus bars 8, 9 to the battery assembly 2 and reducing the assembly man-hours. It is thus possible to reduce the number of components for assembling the power source device 1 and simplify the assembly work.

The positioning means includes a plurality of positioning projections 13 protruding from one end plate 12a of the battery assembly 2 and a plurality of positioning holes 27 arranged in the plate 10, each of the positioning holes 27 having a diameter formed larger than that of the positioning boss 13. It is thus possible to position the battery assembly 2 and the plate 10 by inserting the positioning projections 13 into the positioning holes 27. This reduces the number of components for assembling the plate 10 to the battery assembly 2 and reduces the assembly man-hours.

The plate displacement means includes a plurality of guide projections 14 protruding from one surface 20a of the inter-battery plate 20 of the battery assembly 2 and a plurality of guide holes 28 arranged in the plate 10 into which the plurality of guide projections 14 are respectively inserted. The plurality of bus bars 8, 9 are inclined in a direction respectively leaving the corresponding positive poles 6 and negative poles 7 when the guide projections 14 are inserted into the guide holes 28 as the guide projections 14 leave the battery assembly 2.

It is thus possible to displace the plate 10 with respect to the battery assembly 2 in a direction in which the plurality of bus bars 8, 9 respectively approach the corresponding positive poles 6 and negative poles 7 by inserting the guide projections 14 into the guide holes 28. This allows the plurality of bus bars 8, 9 to respectively abut against the corresponding positive poles 6 and negative poles 7. It is this possible to readily arrange bus bars 8, 9 in a desired position of the battery assembly 2, thereby reducing the number of components for assembling the bus bars 8, 9 to the battery assembly 2 and reducing the assembly man-hours.

The plate 10 includes a main body 21 and a pair of outer side parts 22. The outer side parts 22 as a pair are respectively coupled to the main body 21 via elastically deformable coupling parts 23, thus respectively displacing the main body 21 of the plate 10 and the pair of outer side parts 22 relative to the battery assembly 2. This ensures that the bus bars 8, 9 will respectively abut against the corresponding positive poles 6 and negative poles 7, thus reliably arranging the bus bars 8, 9 in a desired position of the battery assembly 2.

While the positioning means is provided including a pair of positioning projections 13 having the shape of a circular cylinder and positioning holes 27 into which the positioning projections 13 are inserted, the methods for implementing positioning means and the number of positioning means are not limited in the invention. In other words, the positioning means may be implemented through a method other than projections and holes. The number of positioning means may be one or three or more. The invention does not limit the shape or number of projections and holes. Any shape and a desired number of projections and holes may be used.

While the guide projections 14 protrude from one surface 20a of the inter-battery plate 20 of the battery assembly 2 in the above embodiment, the guide projections 14 may protrude from one end surface 5 of the plurality of batteries 3 of the battery assembly 2 in this invention.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-216715 filed on Aug. 23, 2008, the contents of which are incorporated herein for reference.

What is claimed is:

1. A power source device comprising:
a battery assembly which includes a plurality of batteries each having a positive electrode at one end and a negative electrode at the other end;
a plurality of connecting members, each of which connects the positive electrode of one battery and the negative electrode of the other battery of the battery assembly, the one and the other batteries adjoining each other; and
a plate having a surface to which the connecting members are attached, and the plate attached to the battery assembly,
wherein the battery assembly and the plate include a positioning section that relatively positions the battery assembly and the plate; and
wherein the battery assembly and the plate include a plate displacement section that displaces the plate in a direction that is parallel to the surface of the plate to which the connecting members are attached so that the connecting members relatively abut against the corresponding positive electrodes and negative electrodes of the battery assembly when the plate is attached to the battery assembly.

2. The power source device according to claim 1, wherein the positioning section includes a plurality of positioning projections protruding from one surface of the battery assembly and a plurality of positioning holes arranged in the plate into which the positioning projections are respectively inserted; and
wherein a diameter of each of the positioning holes is greater than that of each of the positioning projections.

3. The power source device according to claim 1, wherein the plate displacement section includes a plurality of guide projections protruding from one surface of the battery assembly and a plurality of guide holes arranged in the plate into which the guide projections are respectively inserted; and
wherein the connecting members are inclined in a direction in which the connecting members respectively leave the corresponding positive electrodes and negative electrodes as the guide projections leave the battery assembly.

4. The power source device according to claim 1, wherein the plate includes:
a main body arranged at the center of the battery assembly;
a pair of outer side parts arranged parallel to the main body and sandwiching the main body therebetween; and
elastically deformable coupling parts respectively coupling the main body to the pair of outer side parts.

5. The power source device according to claim 2, wherein the positioning projections protrude from a surface of the battery assembly over which the plate extends.

6. A power source device comprising:
a battery assembly which includes a plurality of batteries each having a positive electrode at one end and a negative electrode at the other end;
a plurality of connecting members, each of which connects the positive electrode of one battery and the negative electrode of the other battery of the battery assembly, the one and the other batteries adjoining each other; and
a plate to which the connecting members are attached, and the plate attached to the battery assembly,
wherein one of the battery assembly and the plate includes a guide projection and the other of the battery assembly and the plate includes a guide receiving portion that receives the guide projection,
wherein the guide projection is inclined relative to an attaching direction along which the plate is moved onto the battery assembly to attach the plate and battery assembly,
whereby movement of the plate along the attaching direction displaces the plate in a direction perpendicular to the attaching direction so that the connecting members relatively abut against the corresponding positive electrodes and negative electrodes of the battery assembly when the plate is attached to the battery assembly.

7. The battery assembly of claim 6, wherein one of the battery assembly and the plate includes a positioning projection and the other includes a positioning receiving portion that receives the positioning projection to relatively position the battery assembly and the plate.

8. The battery assembly of claim 7, wherein the positioning projection has a length that is greater than a length of the guide projection.

9. The battery assembly of claim 7, wherein a cross section area of the positioning projection along the plane is greater than a cross sectional area of the positioning receiving portion along the plane.

10. The battery assembly of claim 6, wherein the guide projection is inclined toward a distal end thereof in a direction along which one of the connectors extend from the respective positive electrode to the respective negative electrode.

11. The battery assembly of claim 6, wherein the guide projection extends outwardly from a surface of the battery assembly toward a distal end of the guide projection at an inclined angle relative the surface of the battery assembly.

12. The power source device of claim 1, wherein the plate is disposed substantially parallel to a top surface of the battery assembly throughout the displacement of the plate.

13. The battery assembly of claim 6, wherein the plate is disposed substantially perpendicular to the attaching direction throughout the movement of the plate.

* * * * *